United States Patent
Horspool et al.

(10) Patent No.: US 11,698,753 B2
(45) Date of Patent: Jul. 11, 2023

(54) FAIRSHARE BETWEEN MULTIPLE SSD SUBMISSION QUEUES

(71) Applicant: Kioxia Corporation, Minato (JP)

(72) Inventors: Nigel Horspool, Abingdon (GB); Brian Clarke, Abingdon (GB)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/177,657

(22) Filed: Feb. 17, 2021

(65) Prior Publication Data

US 2022/0261183 A1    Aug. 18, 2022

(51) Int. Cl.
G06F 3/06    (2006.01)

(52) U.S. Cl.
CPC ............ *G06F 3/0659* (2013.01); *G06F 3/061* (2013.01); *G06F 3/0679* (2013.01); *G06F 2212/7203* (2013.01)

(58) Field of Classification Search
CPC ...... G06F 3/0659; G06F 3/0611; G06F 3/067; G06F 12/0246; G06F 2212/7201–7211; G06F 3/061
See application file for complete search history.

(56) References Cited

U.S. PATENT DOCUMENTS

| | | | |
|---|---|---|---|
| 11,055,028 B1* | 7/2021 | Kamran | G06F 3/0611 |
| 2009/0168525 A1* | 7/2009 | Olbrich | G11C 7/1063 |
| | | | 365/185.11 |
| 2012/0159016 A1* | 6/2012 | Morita | G06F 13/1673 |
| | | | 710/33 |
| 2018/0203605 A1* | 7/2018 | Tseng | G06F 3/0659 |
| 2018/0217951 A1* | 8/2018 | Benisty | G06F 13/1642 |
| 2018/0285294 A1* | 10/2018 | Chagam Reddy | G06F 13/18 |
| 2019/0087342 A1* | 3/2019 | Masuda | G06F 3/0604 |

* cited by examiner

*Primary Examiner* — Kalpit Parikh
(74) *Attorney, Agent, or Firm* — Allen & Overy LLP

(57) ABSTRACT

A method performed by a controller of an SSD, the controller coupled to a non-volatile semiconductor memory device and comprising a first command queue (Q1) and a second command queue (Q2). The method comprises selecting from a submission queue at least one command from a host, the command relating to an action to be performed on the memory device. The method comprises determining if a number of in-flight commands received from the host via the submission queue and already present in Q1 exceeds a threshold. The method comprises adding the selected command to Q2 if the threshold is exceeded, otherwise adding the selected command to Q1. The method comprises processing a first command from Q1 and a second command from Q2 to perform a first action and a second action, respectively, on the memory device, the first action being completed in advance of the second action.

28 Claims, 11 Drawing Sheets

FAIRSHARE BETWEEN MULTIPLE SSD SUBMISSION QUEUES

FIELD

The present disclosure relates to solid-state drives (SSD) and methods that dynamically prioritize command submission queues from a host so as to maximize throughput and improve performance of the SSD.

BACKGROUND

A solid-state drive (SSD) generally has faster performance, is more compact, and is less sensitive to vibration or physical shock than a conventional magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise nonvolatile semiconductor storage devices, such as NAND devices, to store data. A controller is used in an SSD to manage the transfer of data between a host and the memory cells of the SSD. Writing data to and reading data from the physical memory cells of SSDs typically involves transferring data between a host external to the SSD and the nonvolatile semiconductor storage devices.

SSDs employed as datacenters are subject to large volumes of data traffic as they receive multiple read and write requests from the host. The SSDs support multiple requests or commands using submission and completion queues of the host so that multiple applications and host programs can access the data stored in the NAND devices of the SSD. The read performance and read data latency (i.e. the time from the command being added to the submission queue to the time the data is returned to the host memory and the command status is added to the completion queue) are critical elements for the operation of the SSD. Each submission queue can hold thousands of commands which may vary in size, typically between 4 KB and several MB. Further, the SSD may be processing many commands simultaneously since it takes tens of microseconds to complete a read from one of the NAND devices.

To achieve the highest read performance, the size of the commands received from the host needs to be large and/or the command queue depth high (e.g. hundreds of queued commands). However, to get the best latency small size commands (e.g. approximately 4 KB) and low queue depth (e.g. between 4 and 8 commands) are preferable. Often the SSD has multiple applications/host programs accessing the user data stored in the NAND devices, with some requiring the best performance while others requiring best latency. However, applications and host programs that use large read commands and/or large queue depths delay the processing of small read commands that require low latency. These low latency ready commands may be critical for processes running on the host/user end. This imposes a challenges on how to prioritize commands received from submission queues of a host.

SUMMARY

According to an embodiment of the present disclosure there is provided a method performed by a controller of a solid-state drive (SSD), the controller communicatively coupled to a non-volatile semiconductor memory device and comprising a first command queue and a second command queue. The method comprises selecting from a submission queue of a plurality of submission queues at least one command from a host external to the solid state drive, the at least one command relating to an action to be performed on the non-volatile semiconductor memory device. The method also comprises determining if a number of in-flight commands received from the host via the submission queue of the plurality of submission queues and already present in the first command queue exceeds a threshold. Additionally, the method comprises adding the at least one command selected from the submission queue of the plurality of submission queues to the second command queue if the threshold is exceeded, otherwise adding the at least one command to the first command queue. Further, the method comprises processing a first command from the first command queue and a second command from the second command queue to perform a first action and a second action, respectively, on the non-volatile semiconductor memory device, the first action being completed in advance of the second action.

According to another embodiment of the present disclosure there is provided a method performed by a controller of a solid-state drive (SSD), the controller communicatively coupled to a non-volatile semiconductor memory device and comprising a first command queue and a second command queue. The method comprises selecting from a submission queue of a plurality of submission queues at least one command from a host external to the solid state drive, the at least one command relating to an action to be performed on the non-volatile semiconductor memory device. The method also comprises determining if a size of data associated with in-flight commands received from the host via the submission queue of the plurality of submission queues and already present in at least one of the first command queue and second command queue exceeds a threshold. Additionally, the method comprises adding the at least one command selected from the submission queue of the plurality of submission queues to the second command queue if the threshold is exceeded, otherwise adding the at least one command to the first command queue. Further, the method comprises processing a first command from the first command queue and a second command from the second command queue to perform a first action and a second action, respectively, on the non-volatile semiconductor memory device, the first action being completed in advance of the second action.

According to yet another embodiment of the present disclosure there is provided a solid-state drive (SSD) comprising a non-volatile semiconductor memory device, and an SSD controller. The SSD controller is communicatively coupled to the non-volatile semiconductor memory device and configured to store data and retrieve data in the non-volatile semiconductor memory device in response to commands received from a host external to the solid-state drive, the controller comprising a first command queue and a second command queue. The controller is configured to select from a submission queue of a plurality of submission queues at least one command from the host, the at least one command relating to an action to be performed on the non-volatile semiconductor memory device. The controller is also configured to determine if either (i) a number of in-flight commands received from the host via the submission queue of the plurality of submission queues and already present in the first command queue, or (ii) a size of data associated with in-flight commands received from the host via the submission queue of the plurality of submission queues and already present in at least one of the first command queue and second command queue, exceeds a threshold. Additionally, the controller is configured to add the at least one command selected from the submission queue of the plurality of submission queues to the second command queue if the threshold is exceeded, otherwise adding the at least one command to the first command queue. Further, the controller is configured to process a first command from the first command queue and a second command from the second command queue to perform a first action and a second action, respectively, on the non-volatile semiconductor memory device, the first action being completed in advance of the second action.

In some implementations, the commands in the first command queue and the commands in the second command queue are processed in parallel. In certain implementations, the threshold comprises any one of (i) a number of in-flight commands in the first command queue, (ii) a size of data associated with the in-flight commands received from the host, and (iii) a value corresponding to any one of the following command types received from the host: a read command, a write command, and an internal command generated by the controller. In further implementations, the command is any one of: a read command, a write command, and an internal command generated by the controller. In other implementations, the internal command comprises a command related to any one of: garbage collection, patrol read, data refresh, read metadata, write metadata.

In certain implementations, the method further comprises adding at least one read command selected from the submission queue of the plurality of submission queues to the second command queue if the threshold is exceeded, and adding at least one write command selected from the submission queue of the plurality of submission queues and/or an internal command generated by the controller to the second command queue, wherein the internal command comprises a command related to any one of: garbage collection, patrol read, data refresh, read metadata, and write metadata.

In further implementations, the first and second actions are each a function defined by the respective at least one commands. In other implementations, the function comprises a read of data stored in the non-volatile semiconductor memory storage device, or a write of data to the non-volatile semiconductor memory storage device. In some implementations, the method further comprises adding a tag to each of the at least one command selected from the submission queue of the plurality of submission queues to identify which submission queue of the plurality of submission queues the command was selected from.

In further implementations, the selection is based on an NVMe™ round robin arbitration scheme, or an NVMe™ weighted round robin arbitration scheme. In other implementations, the method further comprises selecting another submission queue of the plurality of submission queues according to the arbitration scheme when a maximum number of commands for processing by the controller has been received. In some implementations, the threshold is reduced to a smaller value once the threshold is exceeded. In certain implementations, the threshold is increased to its original value or to a new value when the smaller value threshold is no longer exceeded, and wherein the increase in threshold is either immediate or gradual over time. In other implementations, the controller comprises a PCIe & NVMe™ controller, a memory controller and a non-volatile semiconductor memory device controller, each of which having at least one of a first command queue and a second command queue pair.

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
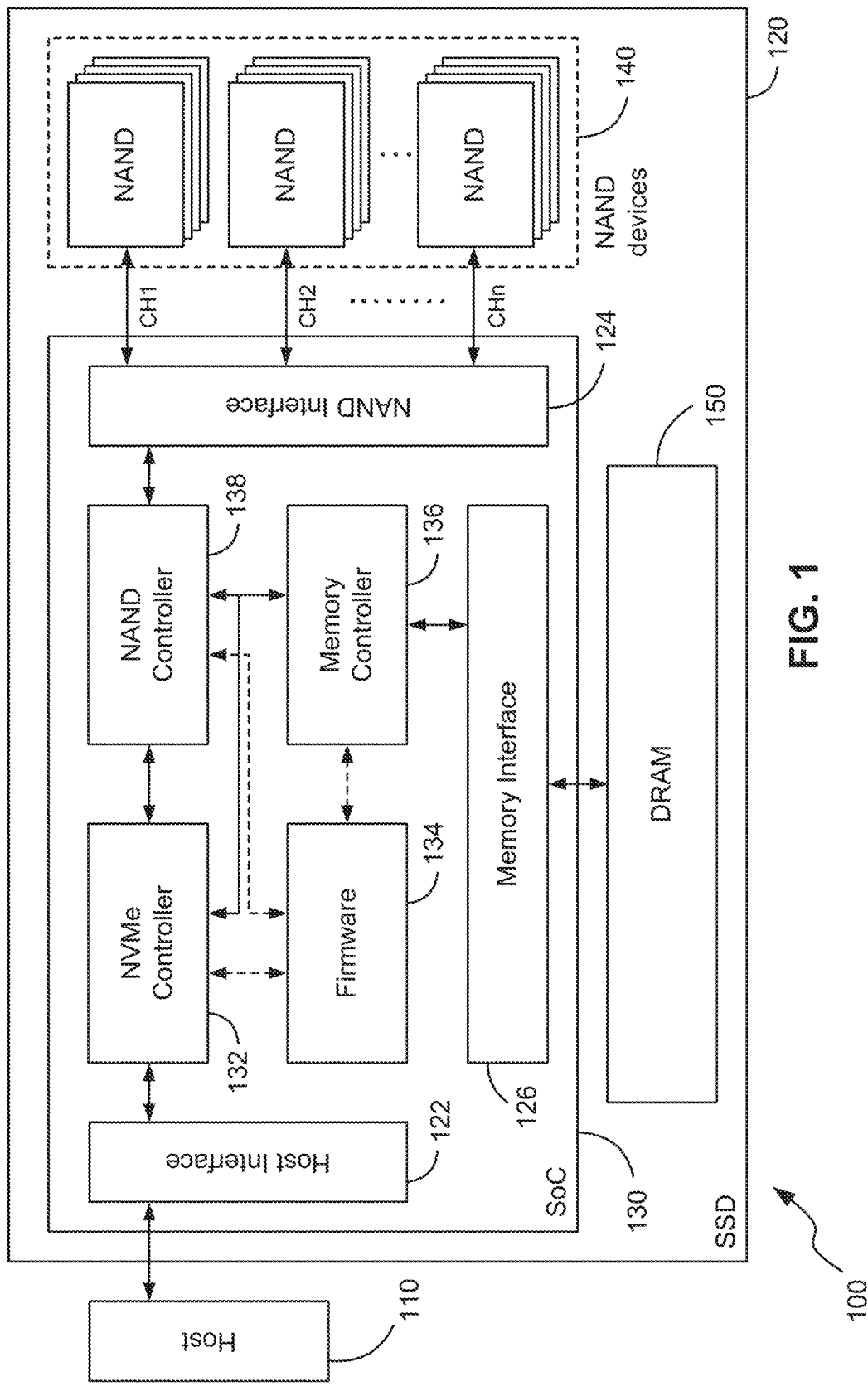
FIG. 1 shows a schematic representation of a solid-state drive (SSD), configured according to one or more embodiments of the present disclosure.

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD architectures with memories having a similar need to prioritize commands from a plurality of submission queues from a host to improve the performance and throughput of the SSD.

Hitherto, read commands sent by a host computer to an SSD are generally given a higher priority by the SSD controller over host write and garbage collection commands (that are internally generated by the SSD controller) for the reason that the read commands are the most latency sensitive. This is due to the fact that a host read command is not complete until the data requested has actually been fetched from non-volatile storage and returned to the host. The host is therefore totally dependent on the completion of memory read commands issued to the non-volatile memory of the SSD (e.g. NAND flash memory devices) via the SSD controller. Host write commands, on the other hand, may be acknowledged to the host as completed as soon as the data to be written has been fetched from the host and temporarily buffered or cached (i.e. quite rapidly) by the memory controller in a volatile memory (e.g. DRAM) and the host write command acknowledged as complete. The SSD controller may then complete the write commands by scheduling memory write or program commands at a subsequent convenient point of time, independent of the completion of the host write command. Even if a subsequent host read command is received by the SSD controller for the same data, it may be serviced by reading the data buffered in volatile memory if it has not already been written to the non-volatile memory of the SSD. Such commands with data buffered in the way just described are often referred to as "in-flight commands," since they are still being processed by the SSD controller and have yet to be fully completed by finally committing the data requested to be written to non-volatile NAND flash memory. Host read commands which have yet to be completed by return of the data requested to the host may also be referred to as in-flight commands.

However, this approach is still susceptible to the host read commands from one application program being temporarily held up or delayed by in-flight read commands from other application programs that have yet to complete. For example, the default for a host read command can be for the read command to be given a high priority, while host write command and internal commands (e.g. read or write commands associated with garbage collection) may be given a lower priority. However, one host application may be issuing a particularly high rate of host read commands with small amounts of data, resulting in the SSD resources becoming consumed by large numbers of in-flight read commands associated with that application. This causes read commands from other applications having to wait for excessive periods for the resources to become free again, despite being given a high priority, resulting in increased latencies for read commands associated with those other applications. In another alternate scenario, one host application may be issuing read commands requesting particularly large amounts of data to be transferred, resulting again in the SSD resources being consumed while large amounts of data are transferred. This causes read commands from other applications having to wait for excessive period for the resources to be freed, despite being given a high priority, causing increased latencies for read commands associated with those other applications.

The present disclosure describes systems and methods to alleviate this problem and improve the so-called long tail latencies suffered by host read commands. The present disclosure describes a vendor specific scheme for the scheduling of commands within the controller which takes into account the number of in-flight commands (and the size of the data being processed for those commands, also known as the in-flight data), that are currently being processed by the SSD controller.

FIG. 1 is a block diagram of a computing system 100 comprising at least one host 110 in communication with a datacenter such as storage device 120, according to an embodiment of the present disclosure. The host 110 is a computing system that comprises processors or cores, a controller, a memory, and other components as is generally known in the art, and which is not shown in FIG. 1 for the sake of brevity. Storage device 120 provides nonvolatile storage functionality for use by the host 110. Storage device 120 is a SSD, which is a nonvolatile storage device that may include an integrated circuit comprising a controller. Such an integrated circuit may also be referred to as a system-on-chip (SoC) controller 130. SoCs are advantageous in SSDs as they provide a single integrated circuit that contains all the required circuitry and components of the electronic system required for the SSD to function. The SoC therefore eliminates the need for a modular discrete component architecture connected by a plurality of busses and buffers.

SoC controller 130 is communicatively coupled to non-volatile semiconductor-based storage devices 140 (such as NAND-based flash memory devices) as the storage medium. The storage medium may comprise a plurality of NAND chips, such as, for example, 32, 64, 128, 256 separate NAND chips, and each NAND chip can be running separate commands on individual dies (not shown) within the chip. As an example, the storage device 140 comprising n NAND chips each with d dies may be servicing up to (n×d) commands from the SoC controller 130 at any one time, where n and d are integers greater than zero. SSD 120 also includes a memory external to the SoC controller 130, such as a dynamic random access memory ("DRAM") 150. DRAM 150 comprises several buffers (not shown) used to buffer data during read and write operations between the host 110 and the storage elements 140 upon receipt of commands from the host 110. In some implementations, the whole or a part of the external memory DRAM 150 may be located within the SoC controller 130. When located within the SoC controller 130, at least a portion of the external memory may be implemented using a fast memory technology, such as static random access memory (RAM). In some implementations the whole or a part of the memory may be implemented using a fast non-volatile memory technology, including, but not limited to, magnetic random access memory (MRAM), resistive random access memory (Re-RAM) or phase change memory (PCM).

SoC controller 130 comprises a host interface 122 which enables communication with the host 110 for the receipt of commands such as read and write requests, for example. SoC controller 130 also includes a NAND interface 124 for communication with the storage elements 140 (through a plurality of channels such as NAND channels CH1, CH2 . . . CHn as shown in FIG. 1, where n is an integer), and a memory interface 126 for communication with the memory 150 external to the SoC. Host interface 122 on the SoC 130 may comprise a Serial Advanced Technology Attachment (SATA) connector or a NVMe™ connector (NVMe™ is an acronym for "NVM express," where "NVM" stands for "nonvolatile memory," hereinafter NVMe) operating with a PCIe® ("Peripheral Component Interface Express," hereinafter PCIe) bus, for example. NAND interface 124 may comprise an Open NAND Flash Interface (ONFI) or a manufacturer's proprietary interface, for example. Memory interface 126 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

SoC controller 130 may comprise a NVMe controller 132 coupled to the host interface 122. The NVMe controller 132, NAND controller 138 and Memory Controller 136 are coupled to a firmware control and configuration circuit 134, which configures and controls the operation (represented by dotted lines in FIG. 1) and the passing of data between these controllers (represented by solid lines in FIG. 1). Memory controller 136 is connected to the DRAM 150 via the memory interface 126. Memory controller 136 is also coupled to the NAND controller 138 which is connected to the NAND interface 124 for communication with the storage elements 140, as is shown in FIG. 1. The NVMe controller 132, the memory controller 136 and the NAND controller 138 are sub-controllers internal to the SoC controller 130 which operate under control of the firmware 134 control and configuration circuit 134. Each of the NVMe controller 132, the memory controller 136 and the NAND controller 138 may have a processor/core to perform dedicated functions.

The NVMe controller 132 may be configured to function in accordance with the NVM Express™ Base Specification (version 1.4) dated Jun. 10, 2019, hereinafter referenced as "NVMe 1.4." The NVM Express™ Base Specification defines various arbitration mechanisms for the SoC controller 130 to adopt when selecting a submission queue from a plurality of submission queues in the host 110 from which to select the next host command to process. Host commands comprise commands that cause data input and/or output (I/O) required during a read or write operation, for example. The firmware control and configuration circuit 134 may comprise application specific integrated circuit (ASIC) logic that is programmable or programmable firmware running on one or more processors. The firmware control and configuration circuit 134 may comprise a flash translation layer that enables the SoC controller 130 to perform various functions that facilitate the processing of read and write commands received from the host 110. One such function may include the orchestration the data flow for the commands between the NVMe controller 132 and the NAND controller. Once the NVMe controller 132 receives commands from a selected submission queue of the host 110, such as read commands or write commands, for example, the firmware control and configuration circuit 134 maps the logical block addresses contained in the host commands to physical NAND addresses. These NAND addresses are then relayed to the memory controller 136 and the NAND controller 138. The NAND controller 138 uses the NAND addresses to then perform an action or function on the memory device 140, as defined by the host command. The solid lines with arrows in FIG. 1 illustrate the passage of data I/O between the host 110 and the SSD 120. For example if the host command is a read command, the NAND controller 138 retrieves data from the specified NAND address in the memory 140. As another example, if the host command is a write command, the NAND controller 138 causes the writing of host data from the host 110 and/or DRAM 150 to the specified NAND address in the memory 140.

Figure 2:
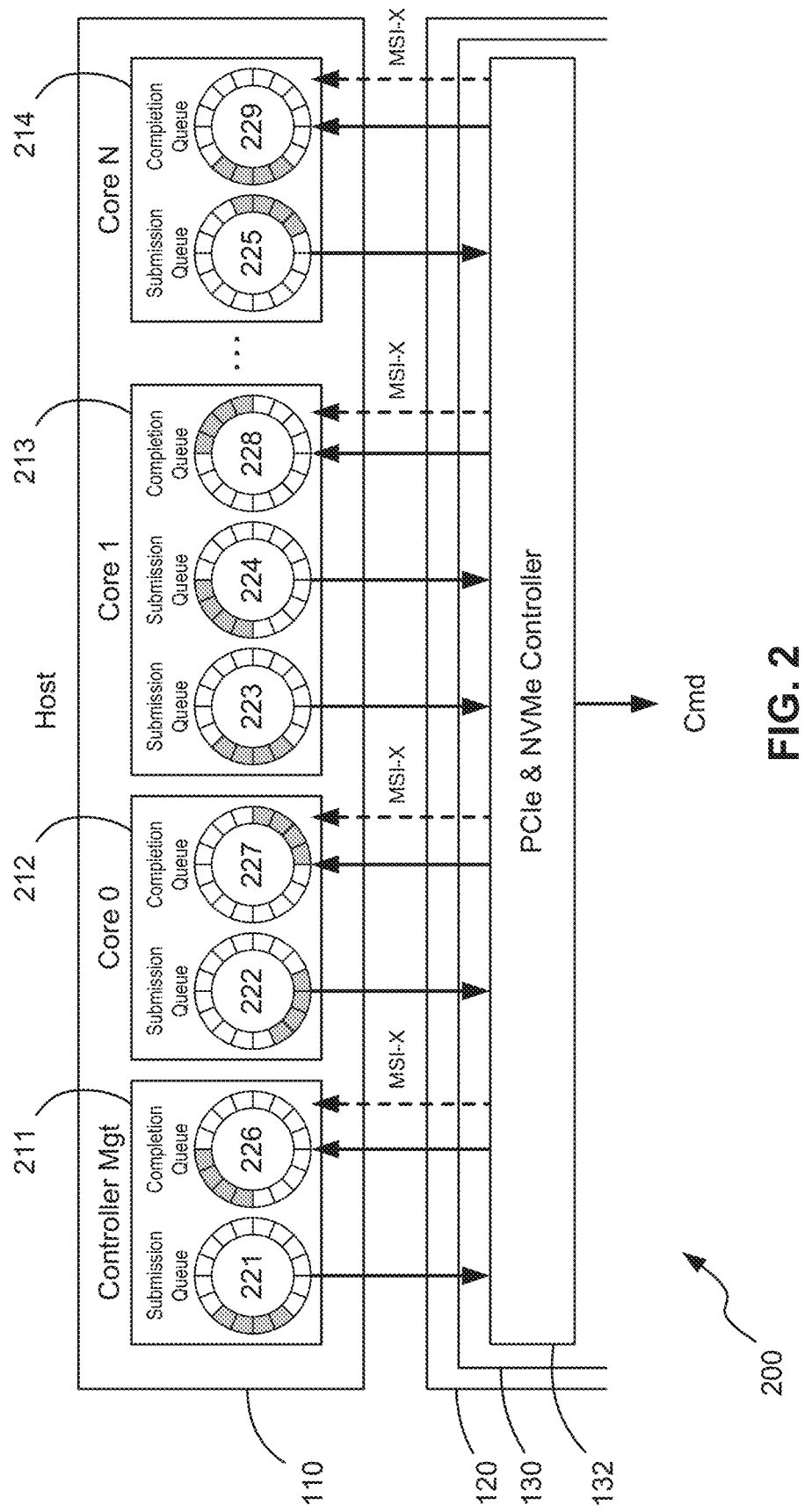
FIG. 2 illustrates the interaction between the various queues of a host and the controller when the SSD processes a command to be actioned on a nonvolatile semiconductor storage device, according to one or more embodiments of the present disclosure.

FIG. 2 shows further details of the host 110 and the NVMe controller 132 of the SSD 120 according to setup 200, according to an embodiment of the present disclosure. The host 110 may comprise a plurality of submission and completion queue groups 211-214 where some queue groups may be associated with a specific processor core such as Core 0, Core 1, . . . Core N, respectively, as shown in FIG. 2, where N is an integer. The controller management queue group 211 may be associated to any core, or may share the core with another core group. In general this is done to provide a form of isolation between the activities of different queue groups, which may be allocated by different application programs running on the host. One of the queue groups 211 may be allocated specifically for controller management and the handling of administrative commands. A queue group may comprise one or more submission queues 221-225 and a completion queue 226-229. Associated with each queue 221-229 there is a hardware doorbell register to facilitate the signaling of incoming commands and outgoing completion notifications from and to the host 110. Incoming commands from the host 110 to the SSD 120 comprise controller administrative and management commands and data I/O commands containing instructions for the SSD 120 and logical block address information for the target data in the NAND devices 140.

The host 110 comprises a driver which sets up at least one submission queue and a completion queue for each queue group 211-214. Once the submission queues and completion queues are configured, they are used for almost all communication between the host 110 and the SSD 120. When new host commands are placed on a submission queue of a respective queue group 211-214, the driver informs the SSD 120 about the new commands by writing a new tail pointer to the submission queue 221-225 of the respective queue group 211-214. The NVMe controller 132 of the SSD 120 then selects a command from a submission queue of the plurality of submission queues 221-225 for processing using an arbitration scheme, which will be detailed below. When the SSD 120 completes processing of a command, it inserts an entry on a completion queue of a specific queue group 211-214 (that has been previously associated with the submission queue of the same queue group from which the command was initially retrieved by the SSD 120), and generates an interrupt signal MSI-X. After the driver completes processing a group of completion queue entries, it signals this to the SSD 120 by writing the completion queue's updated head pointer to the respective completion queue 226-229.

Figure 3A:
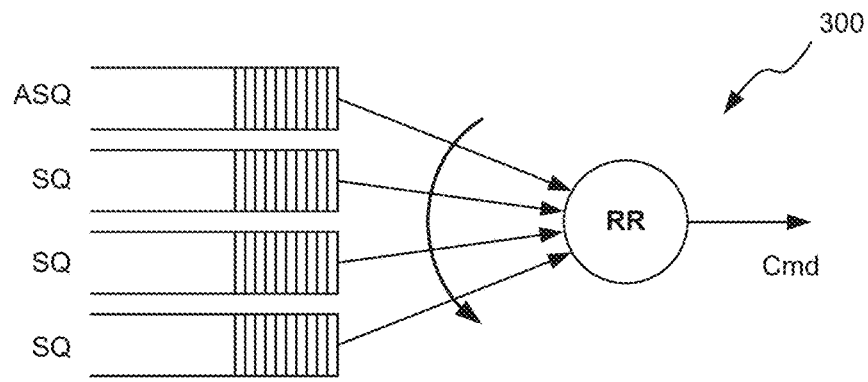
FIG. 3A illustrates a round robin arbitration process flow for selection of a submission queue from a host by an SSD controller according to the NVMe 1.4, as adopted in one or more embodiments of the present disclosure.
Figure 3B:
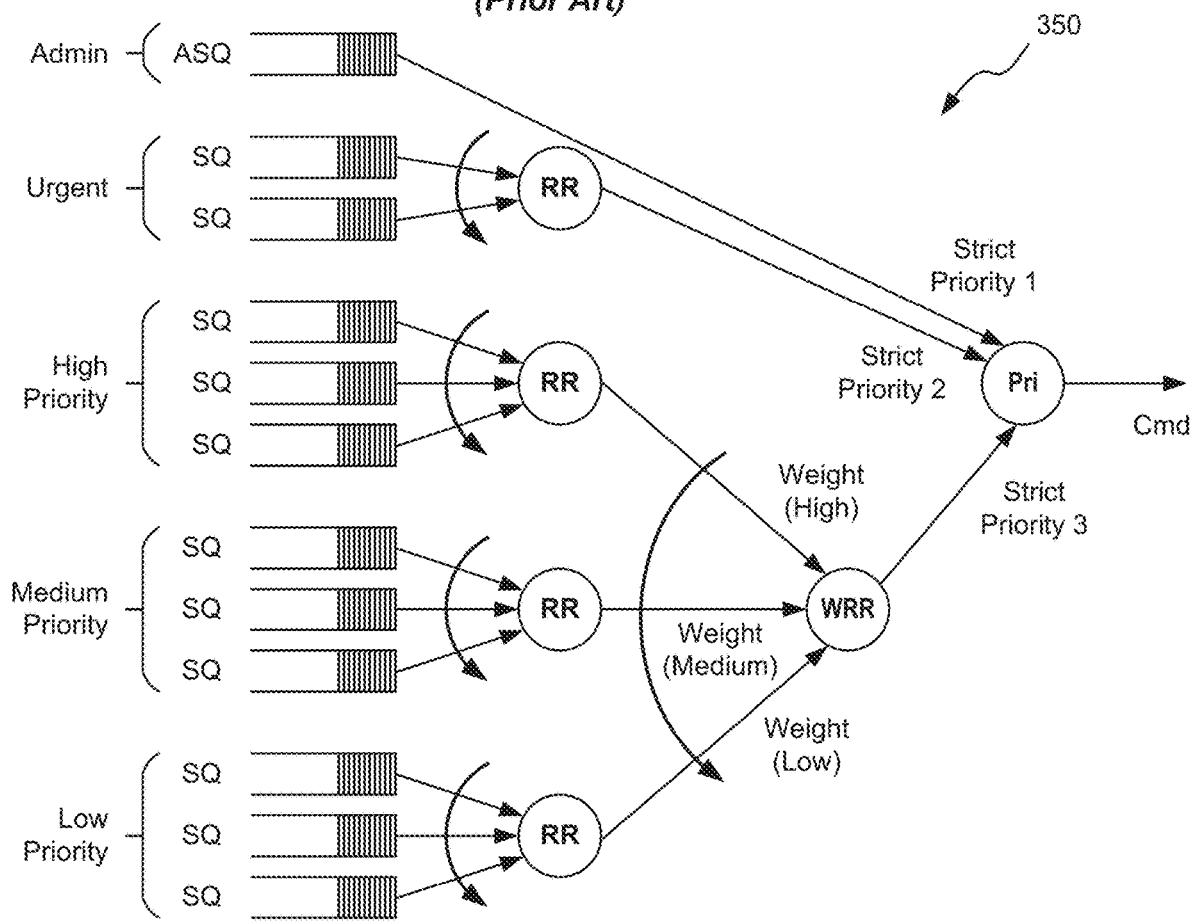
FIG. 3B illustrates a weighted round robin arbitration process flow, with priority, for selection of a submission queue from a host by an SSD controller according to the NVMe 1.4, as adopted in one or more embodiments of the present disclosure.

As previously mentioned, when there is a plurality of submission queues from a host 110 to the SSD 120, the NVMe controller 132 adopts an arbitration scheme to determine the order in which a submission queue is to be selected for processing of the host commands contained therein. Arbitration is the method used to determine the submission queue from which the controller starts processing the next command(s). Once a submission queue is selected using arbitration, an Arbitration Burst setting determines the maximum number of commands that the controller may start processing from that submission queue before arbitration shall again take place. FIGS. 3A and 3B show two exemplary arbitration schemes that are specified in NVMe 1.4, and which are implemented in the NVMe controller 132. FIG. 3A shows command arbitration using a round robin command arbitration mechanism which is the base-line adopted by all NVMe 1.4 controllers, such as the NVMe controller 132 shown in FIG. 1. FIG. 3B shows an optionally implemented weighted round robin command arbitration mechanism with defined priority classes. It will be understood that while the robin command arbitration mechanism and the weighted round robin command arbitration mechanism is exemplified, any NVMe arbitration mechanism may be used in conjunction with the present disclosure for selecting a host submission queue.

FIG. 3A shows a Round Robin (RR) command arbitration mechanism 300 according to NVMe 1.4. In FIG. 3A data I/O commands from various submission queues SQ in the host 110 are selected by NVMe controller 132 of the SSD 120 in sequence using RR arbitration. Admin commands have a separate submission queue ASQ. Notwithstanding, in RR arbitration, all submission queues ASQ and SQ are treated with equal priority, and the NVMe controller 132 selects commands from an ordered sequence of submission queues as illustrated by the counter-clockwise arrow in FIG. 3A. Once a particular submission sequence SQ is selected, the commands "Cmd" contained in that sequence are transmitted to the NVMe controller 132 for processing. In some implementations, only a predetermined number of commands from a specific submission queue may be processed after which the controller 132 moves on the next submission queue SQ to process commands contained therein. The predetermined number of commands is specified in the Arbitration Burst setting of the NVMe controller 132. This predetermined number may be changed by the user. Thus the NVMe controller 132 may select multiple commands for processing from each submission queue SQ per round based on the Arbitration Burst setting.

FIG. 3B shows a Weighted Round Robin (WRR) command arbitration mechanism 350 according to NVMe 1.4. In the WRR command arbitration mechanism, there are three strict priority classes and three WRR priority levels. As an example, based on strict priority classes, if submission queue A is of higher strict priority than submission queue B, then the NVMe controller 132 shall start processing all commands in submission queue A before commands from submission queue B. The highest strict priority class is the Admin class that includes any command submitted to the Admin submission queue. This class has the highest strict priority above commands submitted to any other Submission Queue. The next highest strict priority class is the Urgent class. Any submission queue commands assigned to the Urgent priority class is serviced next after commands submitted to the Admin submission queue, and before any commands submitted to a WRR priority level, as shown in FIG. 3B.

The lowest strict priority class is the WRR class. This class consists of the three priority levels (High, Medium, and Low) that share the remaining bandwidth using WRR arbitration. Weight credit values for the High, Medium and Low classes may be software controlled by the end user. In some embodiments the commands in the submission queues may include two bits defining whether the submission queue is Low, Medium, High or Urgent priority. Round robin command arbitration (as shown in FIG. 3A) is used to arbitrate within multiple submission queues assigned to the same WRR class. The output of the WRR arbitration is then arbitrated again using RR arbitration. Once a particular submission sequence SQ is selected, the commands "Cmd" contained in that sequence are transmitted to the NVMe controller 132 for processing. In some implementations, the number of commands that may start processing from each submission queue per round is either the Arbitration Burst setting (as in the round robin RR command arbitration mechanism 300) or a weighted round robin credit value, whichever is smaller.

Prior to operation, the controller 130 of the SSD 120 indicates to the host 110 whether it supports Weighted Round Robin command arbitration (in addition to Round Robin command arbitration, which is the default mechanism in NVMe and must be supported by all controllers), and/or a Vendor Specific scheme. In some implementations, the arbitration scheme used by the controller 130 is stored in a Controller Capabilities register (not shown) which can be read by the host 110 to indicate such method of selection of data I/O commands from various submission queues.

Figure 4:
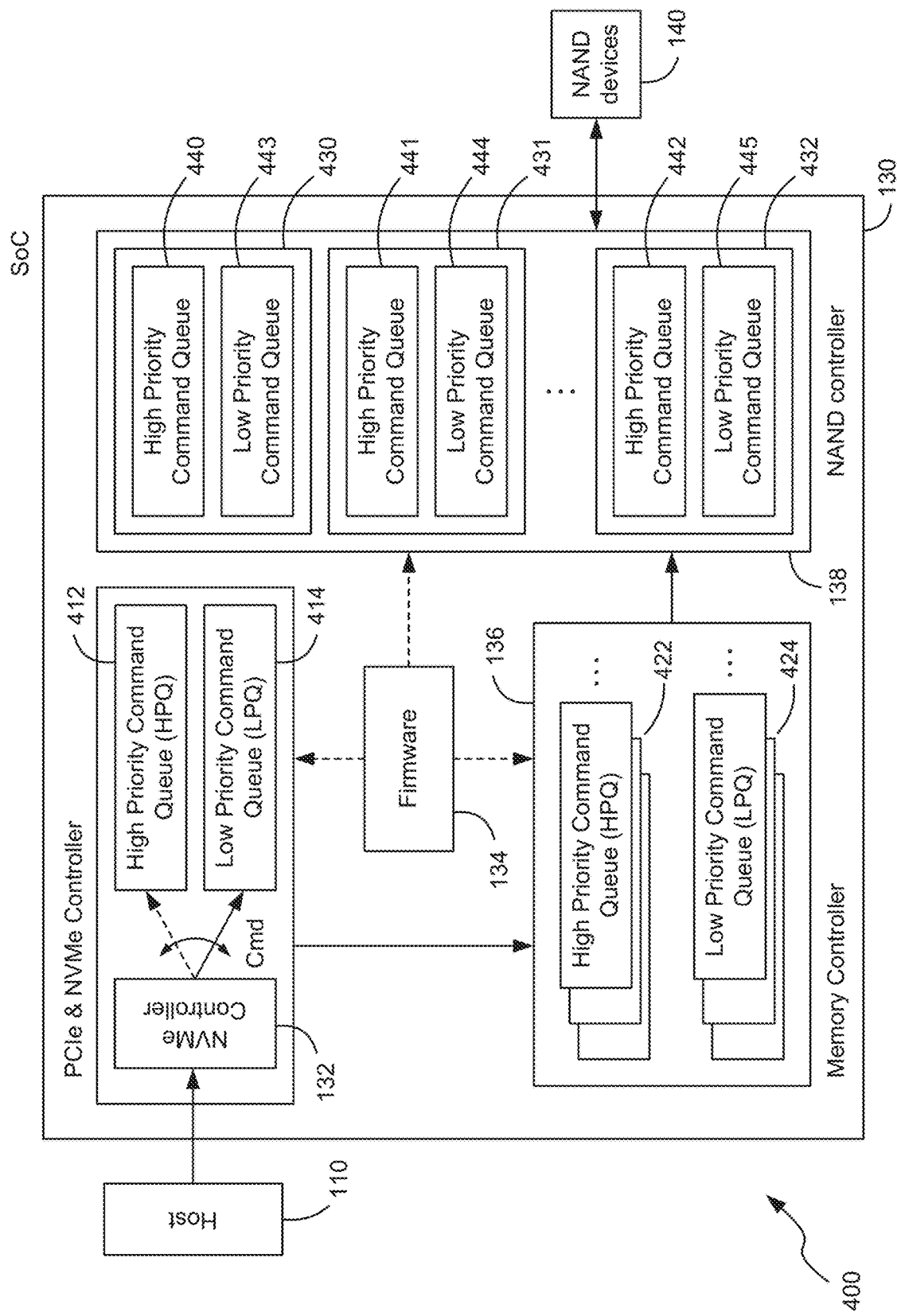
FIG. 4 illustrates the high and low priority command queues, and the various subsections of the SSD controller, when a command is processed from a submission queue of the host, according to one or more embodiments of the present disclosure.

FIG. 4 shows the internal sub-components of the SoC controller 130 in FIG. 1, according to an embodiment of the present disclosure. The host interface 122, the NAND interface 124 and the memory interface 126 have been omitted from FIG. 4 for brevity, however these components are present in the SoC controller 130 during operation. The arrows in the diagram illustrate the transmission of commands from a selected submission queue of the host 110 as it gets processed in relation to the NAND devices 140. The passage of data through the SoC controller 130 has been previously shown in FIG. 1. As mentioned, the selection of a submission queue from the host 110 is described above in relation to FIGS. 3A and 3B. The SoC controller 130 comprises the NVMe controller 132, which is coupled to the memory controller 136, which in turn is coupled to the NAND controller 138, all under the control of the firmware control and configuration circuit 134. The NVMe controller 132 comprises a core (or processor) that utilizes a high priority command queue 412 (hereinafter "HPQ") and a low priority command queue 414 (hereinafter "LPQ") for further processing of commands received from the host 110.

The firmware control and configuration circuit 134 maps logical block addresses (LBAs) in the host commands to physical NAND addresses. This may be done with a look-up table stored in the DRAM 150 and/or the NAND devices 140. The memory controller 136 comprises at least one high priority command queue HPQ 422 and at least one low priority command queue LPQ 424 for processing commands received from the NVMe controller 132. The memory controller 136 is coupled to the NAND controller 138, which, in turn, comprises high priority command queues 440-442 and low priority command queues 443-445. The NAND controller 138 comprises a HPQ and LPQ pair 430-432 for each NAND channel CH1, CH2, . . . CHn of the NAND devices 140. Each of the HPQs and LPQs in the SoC controller 130 is formed in the core of the respective controllers 132, 136, 138.

After receiving commands from a submission queue of the host 110, the NVMe controller 132 core may place the received commands into the HPQ 412 or the LPQ 414 for further processing. In some embodiments, the core of the NVMe controller 132 utilizes a threshold to determine if a particular command Cmd is to be directed to the HPQ 412 or the LHPQ 414. Typically the NVMe controller 132 core places read commands received from the host 110 into the HPQ 412 and these commands are transferred to the HPQs 422 in the memory controller 136 after the LBAs in the read commands in HPQ 412 are mapped to physical NAND addresses. The read commands in the HPQs 422 are then transferred to the HPQ 440-442 of a HPQ-LPQ pair 430-432 of the NAND channel CH1, CH2, . . . CHn which is communicatively coupled to the physical addresses in the NAND devices 140 to which the read commands relate.

In a similar manner, the NVMe controller 132 core places write commands received from the host 110 and the garbage collection commands generated internally within the SoC controller 130 on the LPQ 414, and these commands are transferred the LPQs 424 in the memory controller 136 after the LBAs in the write/garbage collection commands in LPQ 414 are mapped to physical NAND addresses. The write/garbage collection commands in the LPQs 424 are transferred to the LPQ 443-445 of a HPQ-LPQ pair 430-432 of the NAND channel CH0, CH1, . . . CHn which is communicatively coupled to the physical NAND addresses in the NAND devices 140 to which the write/garbage collection commands relate.

According to embodiments of the present disclosure, the SoC controller 130 will process commands in the respective HPQs ahead of the commands in the respective LPQs. Once a command is placed in the HPQ 412, it remains in the HPQ in each of the NVMe controller 132, the memory controller 136 and the NAND controller 138 until it is processed and an action is performed on the NAND devices 140 (e.g. read or write of data).

In some embodiments, at least one command received from a submission queue of the host 110 may be grouped together according to the action they relate to, such as, for example, a read or write from the NAND devices 140, or garbage collection. For example a single read command from the host 110 may actually result in multiple NAND read commands to the NAND devices 140. As another example, a garbage collection command may comprise one command. In certain embodiments, commands from a submission queue relating to the same action are all placed in the same LPQ or HPQ within each controller 132, 136, 138.

According to embodiments of the present disclosure, the core of the NVMe controller 132 manages the submission and completion queues of the host 110 by tracking the number of in-flight commands in each of the HPQ 412 and LPQ 414. In some embodiments, the NVMe controller 132 also tracks the amount of data to be returned to the host 110 or the amount of data to be written to the NAND devices 140. In certain implementations, the NVMe controller 132 adds a tag to each command received from a submission queue to identify the command as belonging to either the HPQ 412 or the LPQ 414.

As mentioned, the core of the NVMe controller 132 utilizes a threshold to determine if a commands received from a submission queue of a host 110 is to be directed to the HPQ 412 or the LPQ 414. The threshold used to define when commands from a submission queue is placed into the HPQ 412 or LPQ 414 may vary based on at least one criterion. Such criteria may include the number of active submission queues, the total number of in-flight commands, the amount of data to be processed for the in-flight commands, and the type of commands, for example. Similar criteria may be utilized by the memory controller 136 and the NAND controller 138 to determine if a command is to be directed to the respective HPQ or LPQ. In some embodiments, any combination of criteria may be used.

In some embodiments, when the criteria is the number of active submission queues, the NVMe controller 132 evaluates the number of submission queues from the host 110, such as submission queues 221-225 as shown in FIG. 2, which are actively sending commands to the SSD 120. The NVMe controller 132 then determines if the number of active submission queues exceeds a maximum number that has been predetermined by the user. This predetermined maximum number of submission queues may be stored in the SoC controller 130, for example in the firmware control and configuration circuit 134. In certain embodiments, if the number of active submission queues does exceed (i.e. is more than) a maximum number of submission queues, the NVMe controller 132 directs commands from all newly added submission queues to the LPQ 414. For completeness, if the number of active submission queues does not exceed (i.e. is less than or equal to) the maximum number of submission queues, the NVMe controller 132 directs commands to the HPQ 412.

In further embodiments, when the criteria is the total number of in-flight commands, the NVMe controller 132 evaluates the number of in-flight commands associated with a submission queue in the HPQ 412. The NVMe controller 132 then determines if the number of in-flight commands exceeds a threshold that has been predetermined by the user. This predetermined threshold of in-flight commands may be stored in the SoC controller 130, for example in the firmware control and configuration circuit 134. In certain embodiments, if the number of in-flight commands does exceed (i.e. is more than) a threshold of in-flight commands for the HPQs 412, 422, 440-442, the NVMe controller 132 directs any new commands to the LPQ 414. The threshold may be expressed as a total maximum number of in-flight commands in the HPQs 412, 422, 440-442 taken in summation, or there may be different individual thresholds for each of the queues HPQs 412, 422, 440-442, where the threshold may be deemed exceeded if any of the individual thresholds are exceeded.

In some implementations, the threshold may be modified with hysteresis, which is to say that once a threshold has been exceeded and new commands are directed to the LPQ 414, the threshold is lowered to a smaller value. Once the lower threshold is no longer exceeded, new commands may now again be directed to the HPQ 412. Once this occurs, the threshold may be raised, say to its original value, either immediately or gradually over time. This prevents the rapid flip-flopping of new commands being directed alternately to the HPQ 412 and LPQ 414.

In some embodiments, when the criterion is the amount of in-flight data being transferred from the NAND devices 140, the NVMe controller 132 evaluates the size of in-flight data in the LPQs 414, 424, 443-445, and HPQs 412, 422, 440-442 (both individually for each queue and in total summation) associated with all commands from the particular submission queue currently selected by arbitration, and determines if the size of each queue exceeds (i.e. is more than) an individual queue threshold or the total size of all queues exceeds a total queue threshold that has been predetermined by the user. These predetermined thresholds may be stored in the SoC controller 130, for example in the firmware control and configuration circuit 134. In certain embodiments, if the amount of in-flight data being transferred in LPQs 414, 424, 443-445, and HPQs 412, 422, 440-442 associated with all commands from a particular submission queue currently selected by arbitration exceeds an individual queue threshold or a total queue threshold, the NVMe controller 132 directs new commands fetched from the submission queue requesting a data transfer from the NAND devices 140 to the LPQ 414. If the amount of in-flight data being transferred is less than or equal to the threshold, the NVMe controller 132 directs new commands fetched from the submission queue to the HPQ 412. The threshold may be expressed as a total maximum amount of in-flight data associated with commands from a particular submission queue in the LPQs 414, 424, 443-445, and HPQs 412, 422, 440-442 taken in summation, or there may be different individual thresholds for each of the queues LPQs 414, 424, 443-445, and HPQs 412, 422, 440-442, where the threshold may be deemed exceeded if any of the individual thresholds are exceeded.

In some implementations, the threshold may be modified with hysteresis, which is to say that once a threshold has been exceeded and new commands are directed to the LPQ 414, the threshold is lowered to a smaller value. Once the lower threshold is no longer exceeded, new commands may now again be directed to the HPQ 412. Once this occurs, the threshold may be raised, say to its original value, either immediately or gradually over time. This prevents the rapid flip-flopping of new commands being directed alternately to the HPQ 412 and LPQ 414.

In certain embodiments, when the criteria is the type of commands, the NVMe controller 132 evaluates type of commands that are received from a submission queue of the host 110. In general the NVMe controller 132 core places read commands on the HPQ 412, while write commands or internal commands generated by the SoC controller 130 itself are placed on the LPQ 414. Such internally generated commands comprise garbage collection, patrol read, data refresh, read metadata, and write metadata commands, for example. In some implementations, a numerical value may be associated with each type of command (e.g. read command=1, write command=2, garbage collection command=3, etc.), and the NVMe controller 132 may then determine if the numerical value for a command type exceeds a maximum value that has been predetermined by the user. This predetermined value may be stored in the SoC controller 130, for example in the firmware control and configuration circuit 134. When the predetermined value is exceeded, the NVMe controller 132 directs the command to either one of the HPQ 412 or the LPQ 414 as defined by the user.

By constantly evaluating commands that are in-flight in the NVMe controller 132, the memory controller 136 and the NAND controller 138, the SSD 120 is making the high/low priority decision based on the current state of the SSD 120, rather than predicting future traffic throughput or by throttling submission queues of the host 110. In this manner the user does not need to configure a threshold or throttling for each individual submission queue. All that is required is a global setup in the firmware to define default preferences for priority. By not throttling the submission queues of the host 110, the SSD 120 will be processing commands at maximum throughput with many in-flight commands, but will prioritize submission queues with a small number of in-flight commands or amount of in-flight data by adding commands from this submission to the respective high priority queues (HPQs) in the controller as long as the threshold set for the maximum number of in-flight commands or amount of in-flight data are not exceeded.

For example the SSD 120 may be receiving data I/O commands concerning different type of data. Data relating to images may involve the transfer of large amounts of data and so a small delay to a part of the image data will not be significant to the overall processing of a read command concerning the image data. However data relating to text documents or messages may involve the transfer of comparatively small amounts of data during a read operation, and this small amount of data needs to be returned from the SSD 120 quickly since the user will notice increased latencies for small data requests. In this example, processing the read command for the large image data would delay the processing of the read command for the small text data since the processing of queues is sequential.

Figure 5A:
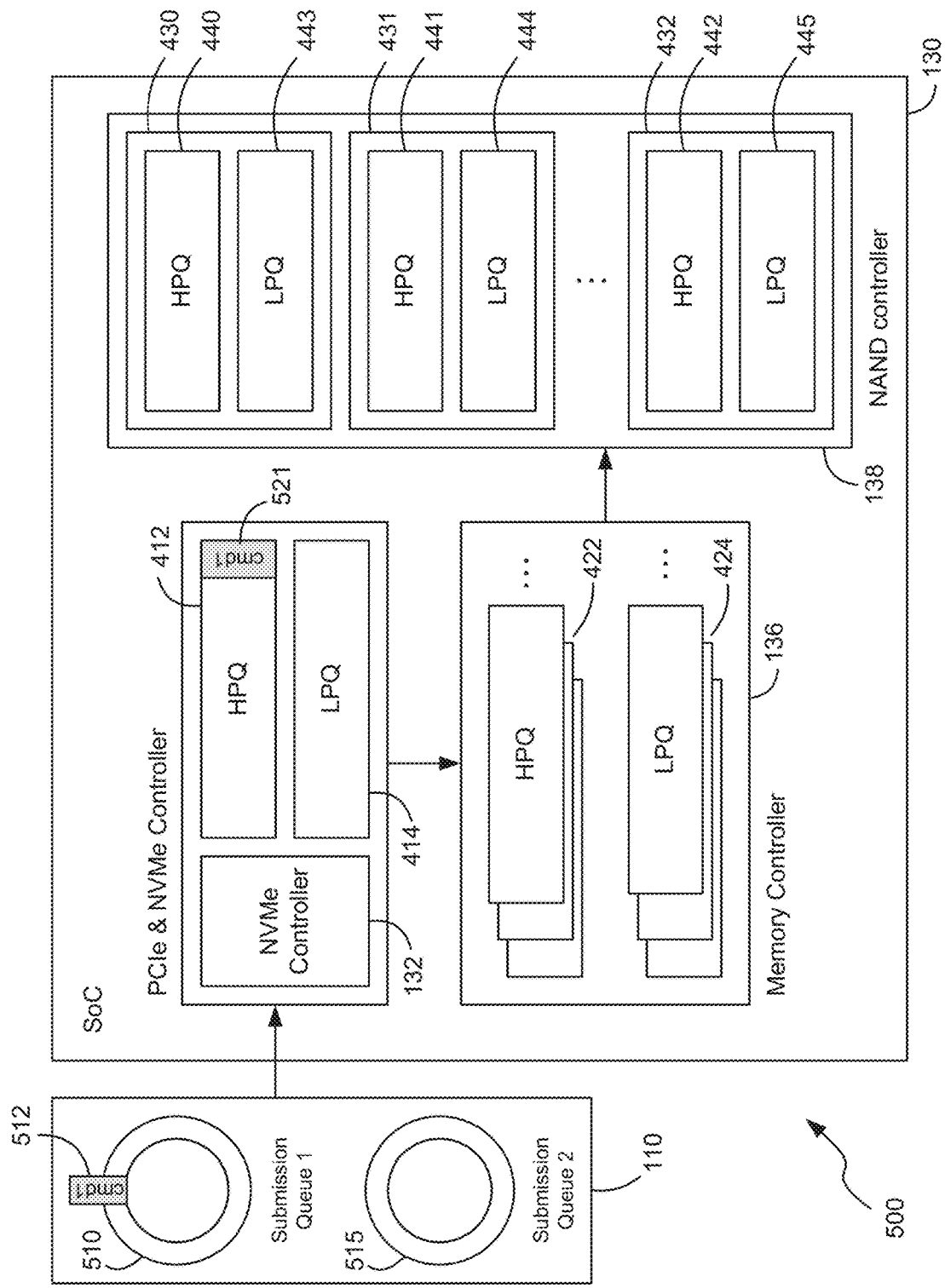
FIGS. 5A-5F illustrate the propagation of exemplary commands selected from a submission queue of a host through the SSD controller and its sub-controllers, according to one or more embodiments of the present disclosure.

FIGS. 5A to 5F illustrate exemplary setups 500 to 505, respectively, of the SoC controller 130 of FIG. 4 when processing read commands from submission queues 510, 515 of a host 110. FIG. 5A depicts an instantaneous view of the NVMe controller 130 at the beginning of processing of a read of large data (e.g. image data) from the NAND devices 140. In FIG. 5A, submission queue 1 510 has been selected by the NVMe controller 132 via the arbitration mechanisms as discussed in the foregoing with respect to FIGS. 3A and 3B. The read of data comprises cmd1 512 received from submission queue 1 510. At the instant depicted in FIG. 5A, there is only cmd1 521 in-flight in the SoC controller 130—in the HPQ 412 of the NVMe controller 132, all the other HPQs 422 and 440-442 being empty. Cmd1 512 in submission queue 1 510 is related to the same action of reading the image from the NAND devices 140, cmd1 512 being the next command after cmd1 521 in a long sequence of commands required to read the large data.

According to embodiments of the present disclosure, when cmd1 512 is transmitted to the NVMe controller 132, the NVMe controller 132 determines if there are any in-flight commands in the LPQ 414. In the instant depicted in FIG. 5A, only cmd1 521 is in-flight. The NVMe controller 132 then determines if one or all of the threshold criteria has been met (e.g. concerning the number of in-flight commands in the HPQs 412, 422, 440-442, and LPQs 414, 424, 443-445, or the amount of data to be read and returned by those commands). As previously mentioned, such criteria may include the number of active submission queues, the total number of in-flight commands, the amount of data to be read and returned for the in-flight commands, and the type of commands, for example. The NVMe controller 132 determines that cmd1 512 relates to the in-flight command 521 connected with the same action of reading image data from the NAND devices 140. Since, for the HPQs 412, 422, 440-442, LPQs 414, 424, 443-445, neither a threshold for the number of in-flight commands related to submission queue 510 nor a threshold for the amount of data associated with such in-flight commands is exceeded, the NVMe controller 132 then adds cmd1 512 to the HPQ 412 of the NVMe controller 132, for processing by the controllers 132, 136, 138.

Figure 5B:
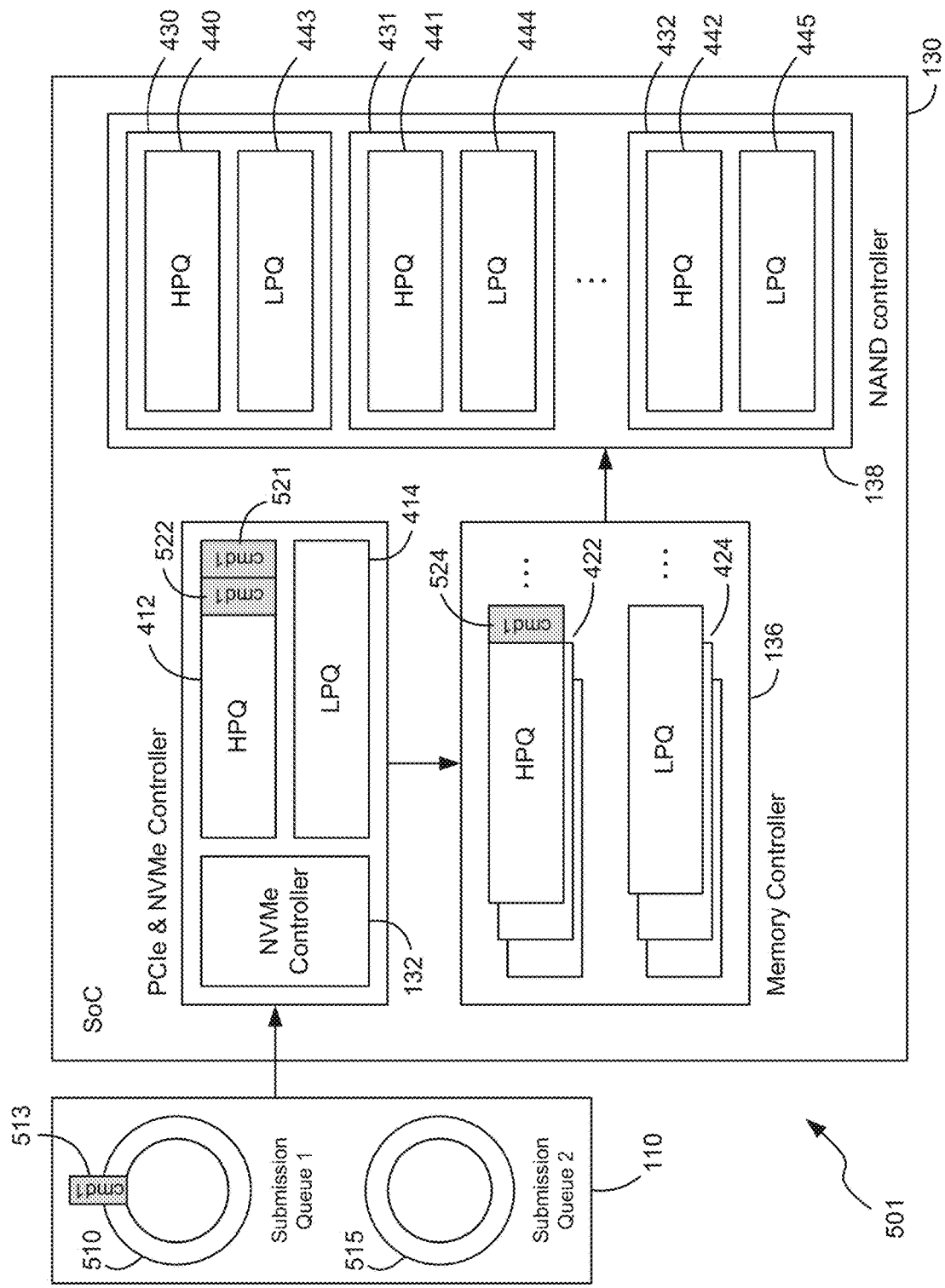

FIG. 5B depicts an instantaneous view of the NVMe controller 130 at a later point in time than FIG. 5A during further processing of the reading of large data (e.g. image data) from the NAND devices 140. At the instant depicted in FIG. 5B, there are now several cmd1s 521, 522 and 524 in-flight in the SoC controller 130—in the HPQs 412 and 422 of the NVMe controller 132. Since, for the HPQs 412, 422, 440-442, LPQs 414, 424, 443-445, neither a threshold for the number of in-flight commands related to submission queue 510 nor a threshold for the amount of data associated with such in-flight commands is exceeded, the NVMe controller 132 then adds cmd1 513 to the HPQ 412 of the NVMe controller 132, for processing by the controllers 132, 136, 138.

Figure 5C:
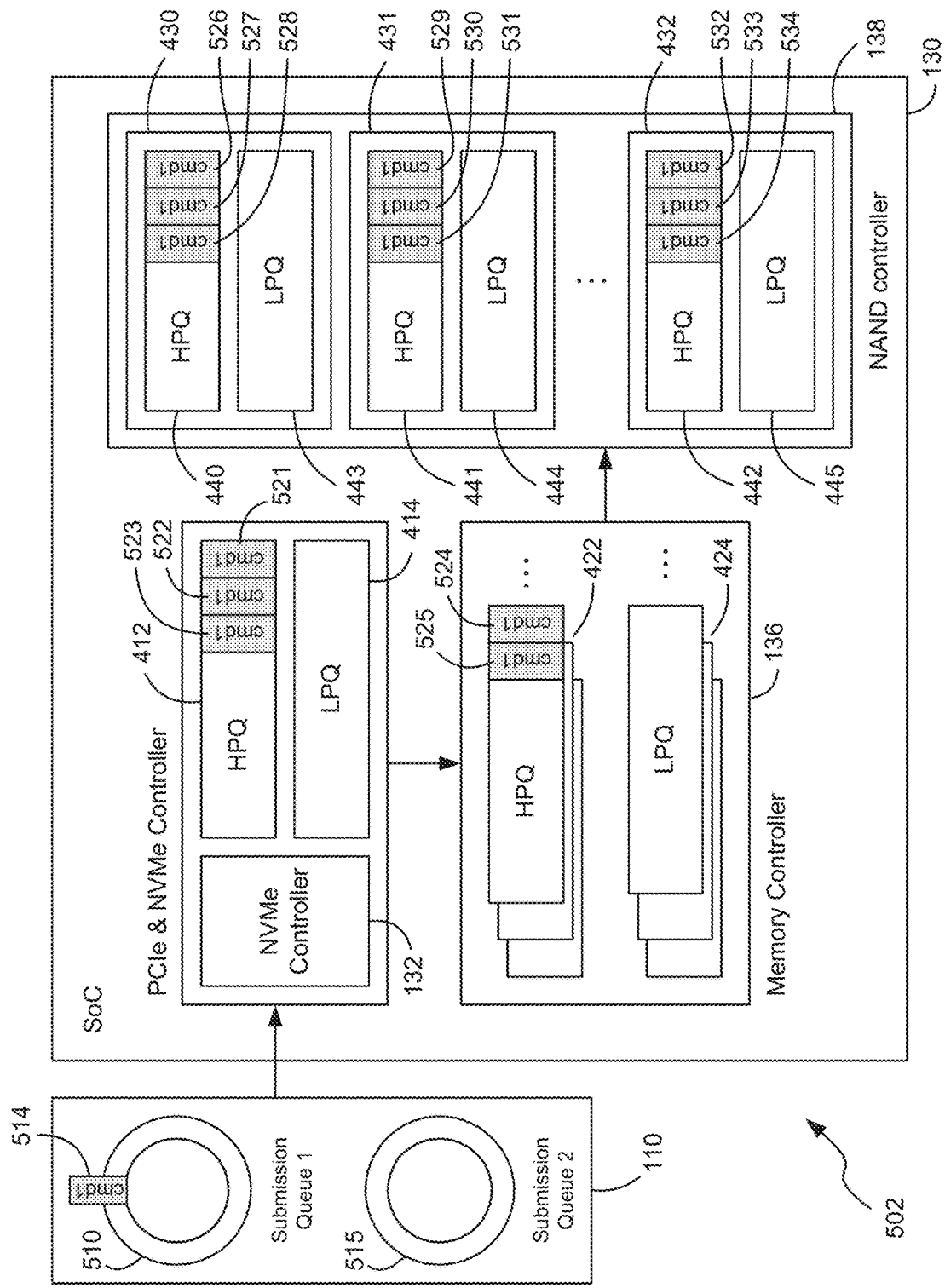

FIG. 5C depicts an instantaneous view of the NVMe controller 130 at a later point in time than FIG. 5B during continued processing of the read of large data from the NAND devices 140. At the instant depicted in FIG. 5C, there are now a larger number of cmd1s 521-534 in-flight in the SoC controller 130 in the HPQs 412, 422 and 443-445 of the NVMe controller 132. Now, for the HPQs 412, 422, 440-442, and LPQs 414, 424, 443-445, a threshold for the number of in-flight commands related to submission queue 510 or a threshold for the amount of data associated with such in-flight commands is about to be exceeded, the NVMe controller 132 then adds cmd1 512 to the HPQ 412 of the NVMe controller 132, for processing by the controllers 132, 136, 138.

Figure 5D:
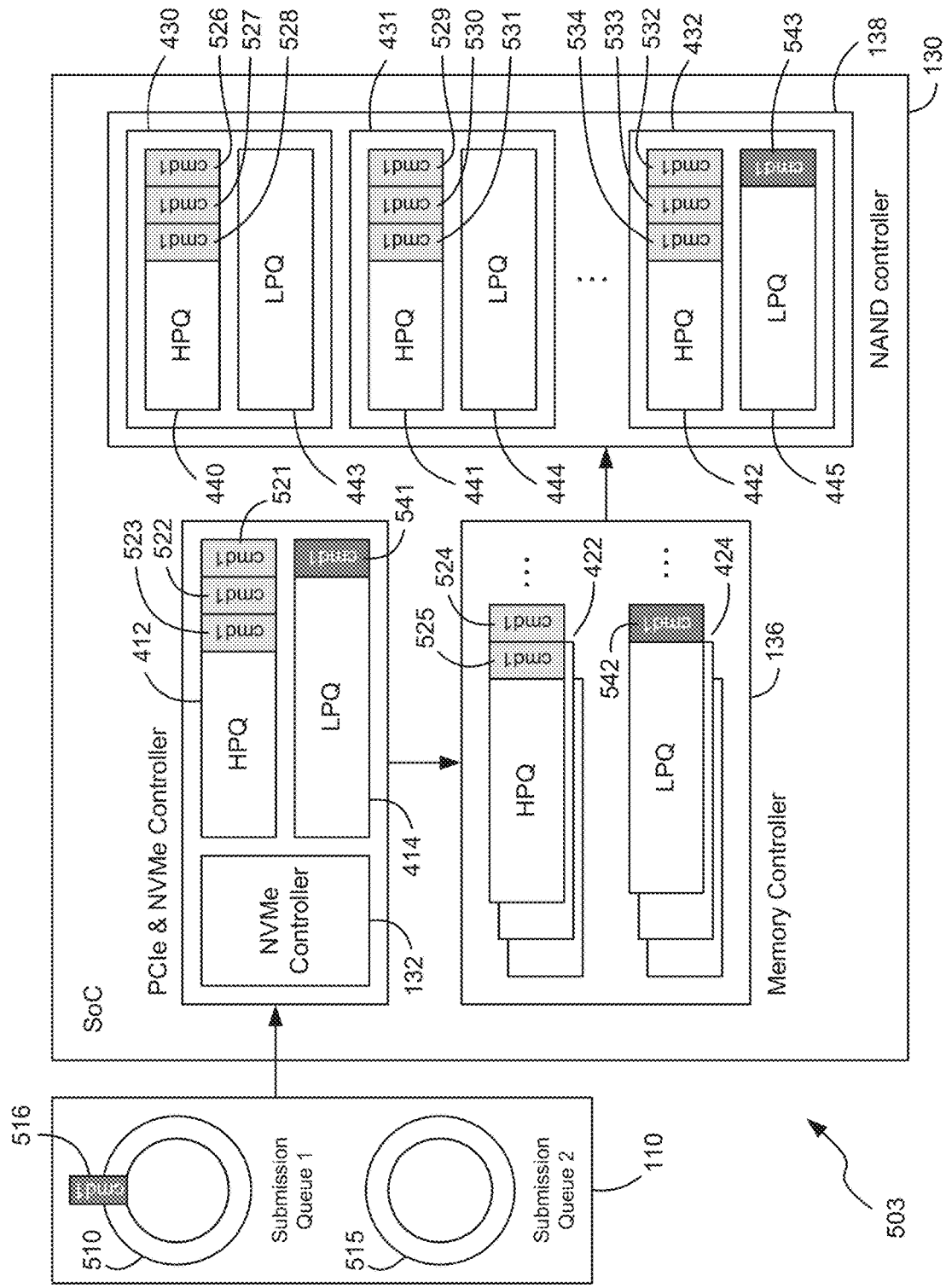

FIG. 5D depicts an instantaneous view of the NVMe controller 130 at a later point in time than FIG. 5C during continued processing of the read of large data from the NAND devices 140. At the instant depicted in FIG. 5C, there are now such a large number of cmd1s 521-534 in-flight in the SoC controller 130 in the HPQs 412, 422, 440-442 of the NVMe controller 132 that a threshold has been reached. Here, for the HPQs 412, 422, 440-442, and LPQs 414, 424, 443-445, a threshold for the number of in-flight commands related to submission queue 510 or a threshold for the amount of data associated with such in-flight commands has been exceeded, such that the NVMe controller 132 has added cmd1 541 to the LPQ 414 of the NVMe controller 132, which has then been processed by the NVMe controller 132 and added cmd1 542 to LPQ 424, then memory controller 136 has added cmd1 543 to LPQ 445. Since, for the HPQs 412, 422, 440-442, and LPQs 414, 424, 443-445, a threshold for the number of in-flight commands related to submission queue 510 or a threshold for the amount of data associated with such in-flight commands has been exceeded, the NVMe controller 132 then adds cmd1 516 to the LPQ 414 of the NVMe controller 132, for processing by the controllers 132, 136, 138.

Figure 5E:
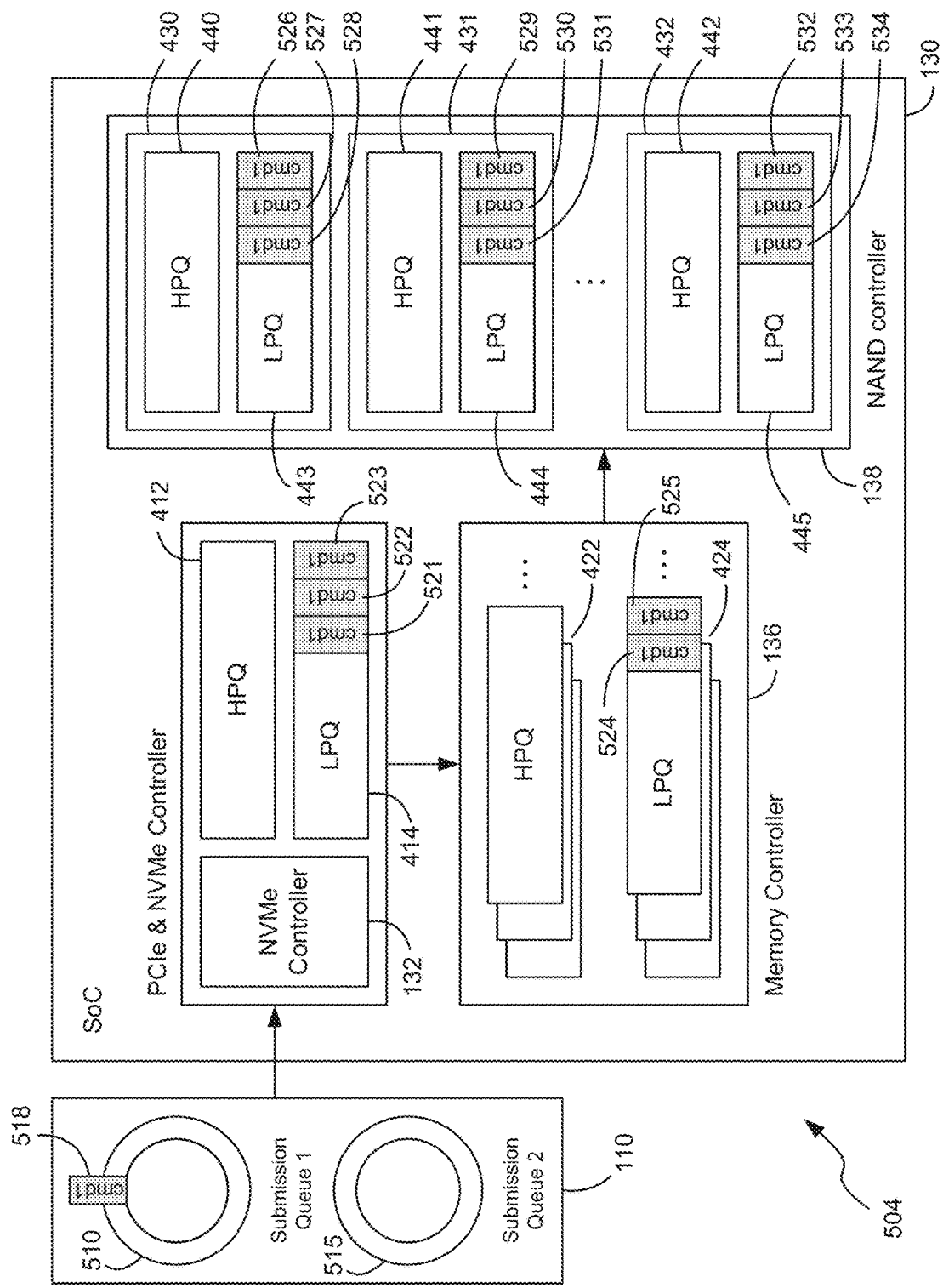

FIG. 5E depicts an instantaneous view of the NVMe controller 130 at a later point in time than FIG. 5D during continued processing of the read of large data from the NAND devices 140. At the instant depicted in FIG. 5E, the large number of cmd1s in-flight in the SoC controller 130 in the HPQs 412, 422, 440-442 of the NVMe controller 132 have all been processed and the HPQs 412, 422, 440-442 of the NVMe controller 132 are now empty, but the reading of the large data has continued. However, due to the continued large number of cmd1s in-flight in the LPQs 414, 424, 443-445, a threshold has still been exceeded, such that the NVMe controller 132 has added every cmd1 518 which has been taken from the submission queue 1 510 and added it to the LPQ 414 of the NVMe controller 132. These cmd1s taken from the submission queue 1 510 have been processed by the NVMe controller 132 and memory controller 136 and now populate the LPQs 414, 424, 443-445 as cmd1 551-564.

Figure 5F:
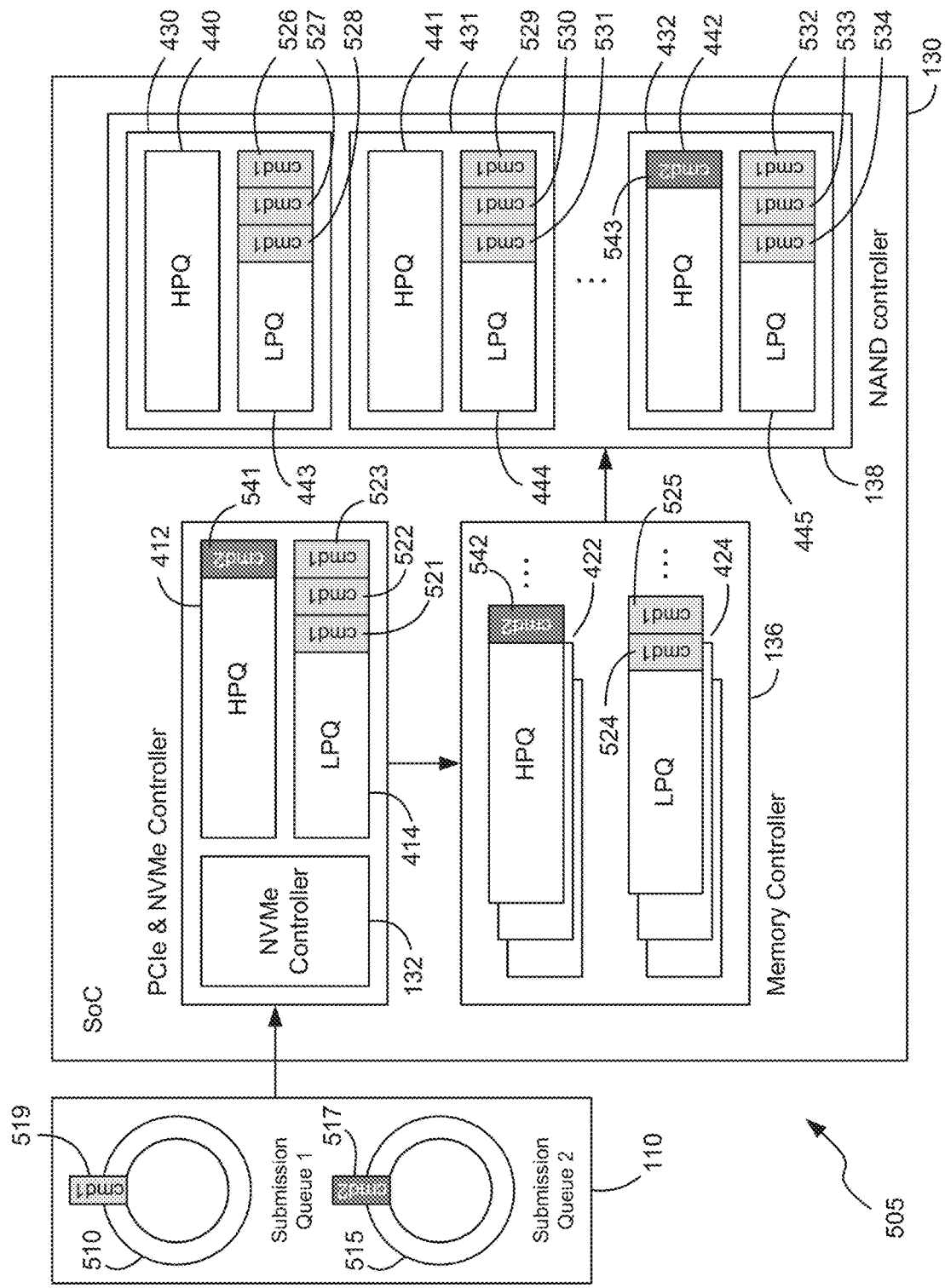

FIG. 5F depicts an instantaneous view of the NVMe controller 130 at a later point in time than FIG. 5E where the processing of the read of large data from the NAND devices 140 has been followed by read commands being added to submission queue 2 515. At the instant depicted in FIG. 5F, a new cmd2 517 is ready to be processed in submission queue 2 515 and three cmd2s 571-573 are in-flight in the SoC controller 130 in the HPQs 412, 422, 442 of the NVMe controller 132. These three cmd2s 571-573 will be processed by HPQs 412, 422, 440-442 of the NVMe controller 132, and HPQs 412, 422, 440-442 will shortly be empty. Since neither a threshold for the number of in-flight commands related to submission queue 515 nor a threshold for the amount of data associated with such in-flight commands is exceeded for the HPQs 412, 422, 440-442 and LPQs 414, 424, 443-445, the NVMe controller 132 then adds cmd2 517 to the HPQ 412 of the NVMe controller 132, for processing by the controllers 132, 136, 138.

According to embodiments of the present disclosure, when cmd2 517 is transmitted to the NVMe controller 132, the NVMe controller 132 determines if there any in-flight commands associated with submission queue 2 515 in the HPQs 412, 414, 440-442 and LPQs 414, 424, 443-445. In the instant depicted in FIG. 5F, there are three cmd2s 571-573 that are in-flight in the HPQs 412, 422, 442. The NVMe controller 132 then determines if any of the threshold criteria has been met, as previous described. The NVMe controller 132 determines that none of the threshold criteria has been exceeded, and the NVMe controller 132 then adds cmd2 517 to the HPQ 412 of the NVMe controller 132, for processing by the controllers 132, 136, 138. In this manner, the NVMe controller 132 effectively prioritizes the processing of command cmd2 517, thereby ensuring that cmd2 is processed with minimal latency. Cmd2 517 will therefore flow through the HPQ 412 of the NVMe controller 132, HPQ 424 of the memory controller 136, and HPQ 442 of the NAND controller 138, ahead of the cmd1s in the respective LPQs 414, 424, 445. Cmd2 517 is the only command relating to its action (which may be a read of text data or image data at this initial stage) and has been sent to the front of the HPQ 412. Cmd2 517 is not stuck behind three larger cmd1s 551-553, had it been sent to the LPQ 414. Cmd2 517 therefore gets processed quickly by the SoC controller 130 compared to cmd1s 551-564. In this manner, commands relating to a relatively quick action, such as cmd2 in FIG. 5F, are not queued and stuck behind commands relating to a larger slower action, such as the cmd1s in FIG. 5F. This situation will persist until a threshold is exceeded for the in-flight commands associated with submission queue 2 515, whereupon any new cmd2 517 will be added to the LPQ 414.

FIGS. 5A-5F serve to illustrate that, at least initially, read commands from a submission queue will be prioritized by adding them to the HPQ 412. However, if the commands being processed from that submission queue begin to fill the HPQs 412, 422, 440-442, such that the number of, or size of data associated with, in-flight commands from that submission queue exceeds a threshold, then NVMe controller 132 will instead add any new commands, such as cmd2 517, to the LPQ 414. This ensures that any one submission queue, e.g. SQ(x) where x is an integer, cannot fill the HPQs with commands and hog the controller resources associated with processing them, causing any other read commands from other submission queues, e.g. SQ(n) where n is an integer and n≠x, to suffer increased latency even though they are also added to the HPQ but have to wait in turn for the commands from the submission queue SQ(x) to be processed.

Figure 6:
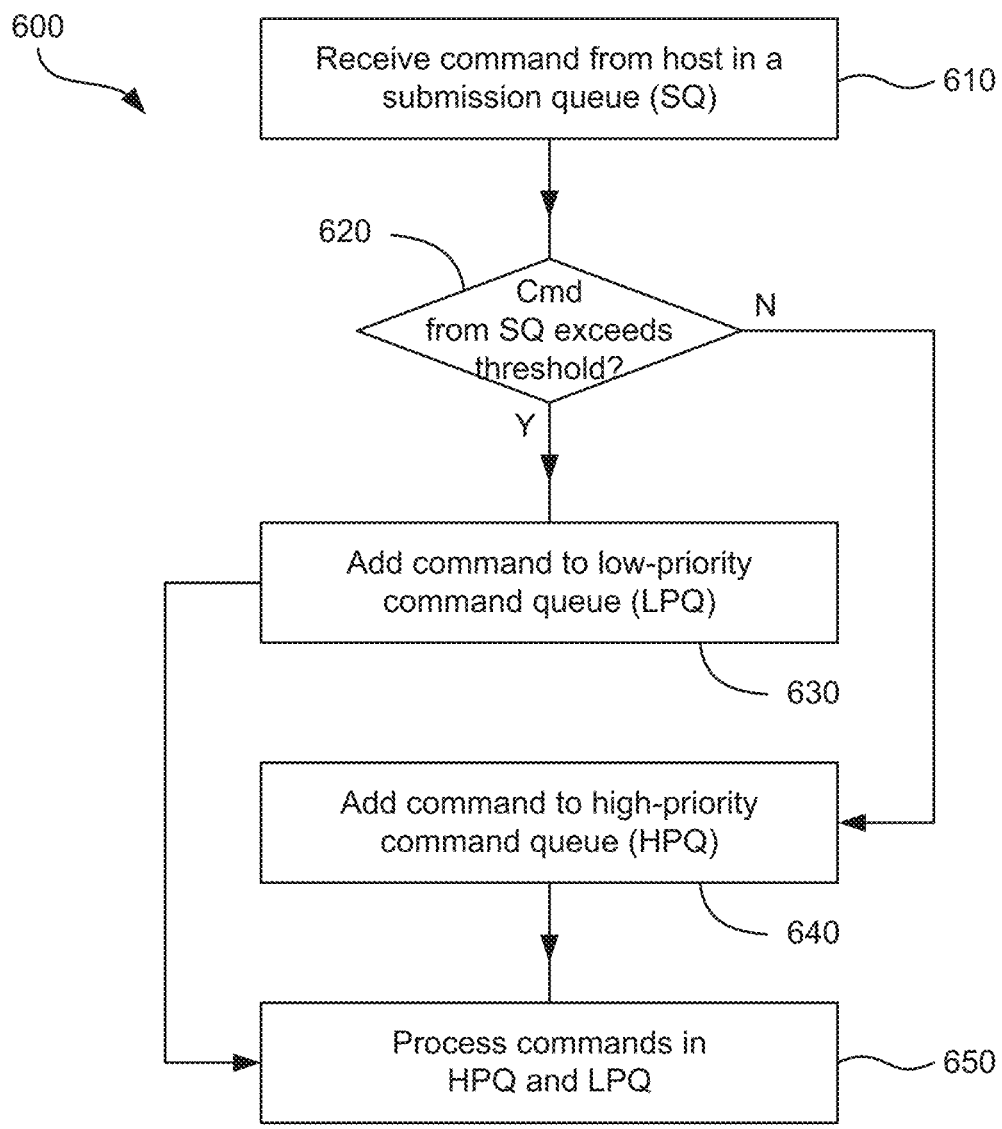
FIG. 6 is a flow diagram of a method for processing commands received from at least one submission queue of the host, according to one or more embodiments of the present disclosure.

FIG. 6 illustrates an exemplary flow diagram of a method 600 for processing a command received from a submission queue of the host 110 according to an embodiment of the present disclosure. The method begins at step 610 where the SoC controller 130 receives at least one command from a submission queue of the host 110. Specifically, the NVMe controller 132 in the SoC controller 130 employs an NVMe 1.4 arbitration mechanism for selecting a submission queue from a plurality of submission queues, such as submission queues 221-225 in host 110. The NVMe controller 132 then receives the at least one command from the selected submission queue for processing. The NVMe controller 132 optionally determines if there are any existing in-flight commands from the selected submission queue in the high priority command queue (HPQ) 412 of the NVMe controller 132. If there are existing in-flight commands in the HPQ 412 from the selected submission queue, the NVMe controller 132 determines if the number of these commands exceeds a threshold in the HPQ 412, as shown in step 620. If there are no existing in-flight commands from the selected submission queue in the HPQ 412, the at least one command received from the host 110 is added to the HPQ 412 of the NVMe controller 132 (step 640).

If the number of existing in-flight commands from the selected submission queue in the HPQ 412 does exceed a threshold in the HPQ 412, i.e. 'Y' in step 620, the at least one command received from the host 110 is added to a low priority command queue (LPQ) 414 of the NVMe controller 132 (step 630). However if the number of in-flight commands from the selected submission queue in the HPQ 412 does not exceed a threshold in the HPQ 412, i.e. 'N' in step 620, the at least one command received from the host 110 is added to the HPQ 412 of the NVMe controller 132, as shown in step 640. The commands in the HPQ 412 and LPQ 414 of the NVMe controller 132 are then relayed to the firmware control and configuration circuit 134 which maps the logical block addresses contained in the commands to physical NAND addresses. The commands are then processed by the remaining sub-controllers 136, 138 of the SoC controller 130, and the respective actions are then performed on the NAND devices 140 (step 650).

In some embodiments the threshold used to define when commands from a submission queue are placed into the LPQ 412 or HPQ 414 in the NVMe controller 132 in step 620 may vary based on at least one criteria. Such criteria may include the number of active submission queues, the total number of in-flight commands, the amount of data to be processed (either returned to the host 110 or written to the NAND devices 140) for the in-flight commands, and the type of commands, for example. Similar criteria may be utilized by the memory controller 136 and the NAND controller 138 to determine if a command is to be directed to the respective HPQ or LPQ. In some embodiments, any combination of criteria may be used. In some embodiments the threshold may be varied according to whether the threshold has just been exceeded (after previously not been exceeded for some time), in which case it may be reduced, or whether it has just not been exceeded (after previously being exceeded for some time), in which case it may be increased. The varying of thresholds in this way is intended to provide hysteresis in the switching between selecting the HPQ and LPQ on successive commands, to prevent the selection from switching alternately between HPQ and LPQ on successive commands.

In the foregoing, all recitation of "module" or "layer" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function. Further, all instances of "cmd1" in the foregoing relates to various commands for performing a single first action on the NAND devices, such as read of large data (e.g. image data). Similarly, all instances of "cmd2" in the foregoing relates to various commands for performing a single second action, different to the first action, on the NAND devices, such as read of small data (e.g. text data).

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller within a solid-state drive (SSD), the controller communicatively coupled to a non-volatile semiconductor memory device and comprising a first command queue and a second command queue, the method comprising:
   selecting from a submission queue of a plurality of submission queues at least one command from a host external to the solid state drive, the at least one command relating to an action to be performed on the non-volatile semiconductor memory device, the action comprising any one of the following types of action: reading from the memory device, writing to the memory device, and executing an internal command generated by the controller;
   determining if a number of in-flight commands received from the host via the submission queue of the plurality of submission queues and already present in the first command queue exceeds a threshold, at least a portion of the in-flight commands already present in the first command queue relating to a same type of action to be performed on the non-volatile semiconductor memory device as that of the selected at least one command;
   adding the at least one command selected from the submission queue of the plurality of submission queues to the second command queue if the threshold is exceeded, otherwise adding the at least one command to the first command queue; and
   processing a first command from the first command queue and a second command from the second command queue to perform a first action and a second action, respectively, on the non-volatile semiconductor memory device, the first action being completed in advance of the second action.

2. The method of claim 1, wherein the commands in the first command queue and the commands in the second command queue are processed in parallel.

3. The method of claim 1, wherein the threshold comprises any one of (i) a number of in-flight commands in the first command queue, (ii) a size of data associated with the in-flight commands received from the host, and (iii) a value corresponding to any one of the following command types received from the host: a read command, a write command, and an internal command generated by the controller.

4. The method of claim 1, wherein the command is any one of: a read command, a write command, and an internal command generated by the controller.

5. The method of claim 4, wherein the internal command comprises a command related to any one of: garbage collection, patrol read, data refresh, read metadata, write metadata.

6. The method of claim 1, further comprising:
   adding at least one read command selected from the submission queue of the plurality of submission queues to the second command queue if the threshold is exceeded, and
   adding at least one write command selected from the submission queue of the plurality of submission queues and/or an internal command generated by the controller to the second command queue,
   wherein the internal command comprises a command related to any one of: garbage collection, patrol read, data refresh, read metadata, and write metadata.

7. The method of claim 1, wherein the first and second actions are each a function defined by the respective at least one commands.

8. The method of claim 7, wherein the function comprises a read of data stored in the non-volatile semiconductor memory storage device, or a write of data to the non-volatile semiconductor memory storage device.

9. The method of claim 1, further comprising:
   adding a tag to each of the at least one command selected from the submission queue of the plurality of submission queues to identify which submission queue of the plurality of submission queues the command was selected from.

10. The method of claim 1, wherein the selection is based on an NVMe™ round robin arbitration scheme, or an NVMe™ weighted round robin arbitration scheme.

11. The method of claim 10, further comprising:
   selecting another submission queue of the plurality of submission queues according to the arbitration scheme when a maximum number of commands for processing by the controller has been received.

12. The method of claim 1, wherein the threshold is reduced to a smaller value once the threshold is exceeded.

13. The method of claim 12, wherein the threshold is increased to its original value or to a new value when the smaller value threshold is no longer exceeded, and wherein the increase in threshold is either immediate or gradual over time.

14. A method performed by a controller within a solid-state drive (SSD), the controller communicatively coupled to a non-volatile semiconductor memory device and comprising a first command queue and a second command queue, the method comprising:
   selecting from a submission queue of a plurality of submission queues at least one command from a host external to the solid state drive, the at least one command relating to an action to be performed on the non-volatile semiconductor memory device, the action comprising any one of the following types of action: reading from the memory device, writing to the memory device, and executing an internal command generated by the controller;
   determining if a size of data associated with in-flight commands received from the host via the submission queue of the plurality of submission queues and already present in at least one of the first command queue and second command queue exceeds a threshold, at least a portion of the in-flight commands already present in the first command queue relating to a same type of action to be performed on the non-volatile semiconductor memory device as that of the selected at least one command;
   adding the at least one command selected from the submission queue of the plurality of submission queues to the second command queue if the threshold is exceeded, otherwise adding the at least one command to the first command queue; and
   processing a first command from the first command queue and a second command from the second command queue to perform a first action and a second action, respectively, on the non-volatile semiconductor memory device, the first action being completed in advance of the second action.

15. The method of claim 14, wherein the commands in the first command queue and the commands in the second command queue are processed in parallel.

16. The method of claim 14, wherein the threshold comprises any one of (i) a number of in-flight commands in the first command queue, (ii) a size of data associated with the in-flight commands received from the host, and (iii) a value corresponding to any one of the following command types received from the host: a read command, a write command, and an internal command generated by the controller.

17. The method of claim 14, wherein the command is any one of: a read command, a write command, and an internal command generated by the controller.

18. The method of claim 17, wherein the internal command comprises a command related to any one of: garbage collection, patrol read, data refresh, read metadata, write metadata.

19. The method of claim 14, further comprising:
   adding at least one read command selected from the submission queue of the plurality of submission queues to the second command queue if the threshold is exceeded, and
   adding at least one write command selected from the submission queue of the plurality of submission queues and/or an internal command generated by the controller to the second command queue,
   wherein the internal command comprises a command related to any one of: garbage collection, patrol read, data refresh, read metadata, and write metadata.

20. The method of claim 14, wherein the first and second actions are each a function defined by the respective at least one commands.

21. The method of claim 20, wherein the function comprises a read of data stored in the non-volatile semiconductor memory storage device, or a write of data to the non-volatile semiconductor memory storage device.

22. The method of claim 14, further comprising:
   adding a tag to each of the at least one command selected from the submission queue of the plurality of submission queues to identify which submission queue of the plurality of submission queues the command was selected from.

23. The method of claim 14, wherein the selection is based on an NVMe™ round robin arbitration scheme, or an NVMe™ weighted round robin arbitration scheme.

24. The method of claim 23, further comprising:
   selecting another submission queue of the plurality of submission queues according to the arbitration scheme when a maximum number of commands for processing by the controller has been received.

25. The method of claim 14, wherein the threshold is reduced to a smaller value once the threshold is exceeded.

26. The method of claim 25, wherein the threshold is increased to its original value or to a new value when the smaller value threshold is no longer exceeded, and wherein the increase in threshold is either immediate or gradual over time.

27. A solid-state drive (SSD) comprising:
   a non-volatile semiconductor memory device; and
   a controller contained within the SSD, the SSD communicatively coupled to the non-volatile semiconductor memory device and configured to store data and retrieve data in the non-volatile semiconductor memory device in response to commands received from a host external to the solid-state drive, the controller comprising a first command queue and a second command queue, and configured to:
      select from a submission queue of a plurality of submission queues at least one command from the host, the at least one command relating to an action to be performed on the non-volatile semiconductor memory device, the action comprising any one of the following types of action: reading from the memory device, writing to the memory device, and executing an internal command generated by the controller,
      determine if either (i) a number of in-flight commands received from the host via the submission queue of the plurality of submission queues and already present in the first command queue, or (ii) a size of data associated with in-flight commands received from the host via the submission queue of the plurality of submission queues and already present in at least one of the first command queue and second command queue, exceeds a threshold, at least a portion of the in-flight commands already present in the first command queue relating to a same type of action to be performed on the non-volatile semiconductor memory device as that of the selected at least one command,
      add the at least one command selected from the submission queue of the plurality of submission queues to the second command queue if the threshold is exceeded, otherwise adding the at least one command to the first command queue, and process a first command from the first command queue and a second command from the second command queue to perform a first action and a second action, respectively, on the non-volatile semiconductor memory device, the first action being completed in advance of the second action.

28. The SSD of claim 27, wherein the controller comprises a PCIe & NVMe™ controller, a memory controller and a non-volatile semiconductor memory device controller, each of which having at least one of a first command queue and a second command queue pair.

* * * * *